US011612204B2

(12) United States Patent
Maltz (10) Patent No.: US 11,612,204 B2
(45) Date of Patent: Mar. 28, 2023

(54) CLIP DEVICE AND METHOD FOR RETAINING PROTECTIVE EYEWEAR (71) Applicant: Abel Unlimited, Inc., Riviera Beach, FL (US)

(72) Inventor: Marvin Maltz, Riviera Beach, FL (US)

(73) Assignee: Abel Unlimited. Inc., Riviera Beach, FL (US)

(*) Notice: Subject to any disclaimer, the term of this patent is extended or adjusted under 35 U.S.C. 154(b) by 364 days.

(21) Appl. No.: 16/984,631

(22) Filed: Aug. 4, 2020

(65) Prior Publication Data
US 2022/0039501 A1 Feb. 10, 2022

(51) Int. Cl.
*A42B 3/04* (2006.01)
*A44B 13/00* (2006.01)
*F16B 2/22* (2006.01)

(52) U.S. Cl.
CPC ............ *A42B 3/0406* (2013.01); *A44B 13/00* (2013.01); *F16B 2/22* (2013.01)

(58) Field of Classification Search
CPC ......... A42B 3/0406; A42B 3/04; A42B 3/185; Y10T 24/1394; A44B 13/00; F16B 2/22; F16B 2/245
See application file for complete search history.

(56) References Cited

U.S. PATENT DOCUMENTS

| 3,273,163 | A | * | 9/1966 | Andrews, III | ........... | A42B 3/04 |
| | | | | | | 2/422 |
| 4,475,676 | A | * | 10/1984 | Smith | ..................... | A63B 57/30 |
| | | | | | | 24/3.12 |
| 4,479,738 | A | * | 10/1984 | Kubnick | ................... | A61F 9/06 |
| | | | | | | 2/10 |
| 4,764,989 | A | * | 8/1988 | Bourgeois | .............. | A42B 3/185 |
| | | | | | | 24/301 |
| 4,796,308 | A | * | 1/1989 | Bourgeois | .............. | A42B 3/185 |
| | | | | | | 24/301 |
| 5,066,154 | A | * | 11/1991 | Renaud | ..................... | A42B 3/04 |
| | | | | | | 24/3.12 |
| 8,193,940 | B2 | * | 6/2012 | Cummings | .............. | A42B 3/04 |
| | | | | | | 340/572.1 |
| 8,214,920 | B1 | * | 7/2012 | Edgar | ...................... | A42B 3/04 |
| | | | | | | 2/8.2 |
| 11,160,329 | B2 | * | 11/2021 | Gall | ....................... | A44B 11/06 |
| 2021/0153588 | A1 | * | 5/2021 | Tsai | ....................... | A42B 3/185 |

* cited by examiner

*Primary Examiner* — Robert Sandy
*Assistant Examiner* — Louis A Mercado
(74) *Attorney, Agent, or Firm* — Fox Rothschild LLP; Robert J. Sacco; Carol E. Thorstad-Forsyth (57) ABSTRACT Systems and methods for coupling a clip to a wearable item with a receiver. The methods involve: receiving the clip's latch structure in the receiver's channel; sliding the latch structure's side members against a channel surface; sliding the latch structure's latch body against the channel's opening edge; bending the latch body by biasing the latch body towards the latch structure's common body portion as the latch body slides against the edge; inserting the latch body and the side members through the channel until at least the free end of the latch body no longer resides in the channel, the latch body automatically unbending when the free end of the latch body no longer resides in the channel; and preventing at least the free end of the latch body from re-entering the channel such that the clip is coupled to the wearable item.

17 Claims, 13 Drawing Sheets

CLIP DEVICE AND METHOD FOR RETAINING PROTECTIVE EYEWEAR

BACKGROUND

Statement of the Technical Field

The disclosure generally relates to a clip device. More particularly, the disclosure relates to a clip device and a method for retaining protective eyewear.

DESCRIPTION OF THE RELATED ART

The Occupational Safety and Health Administration (OSHA) identifies requirements for employers to ensure the safety of their employees. An example requirement is the provision of head protection for individuals performing certain tasks. This requirement can be met using a protective helmet (e.g., a hard-hat safety helmet) when the individuals are working in areas (e.g., construction sites or industrial sites) where there is a potential of head injury, such as from falling objects. OSHA may also require the individuals to additionally wear ear muffs to protect their hearing from injury and/or protective goggles to protect their eyes from injury, when performing those or other tasks.

One challenge with protective goggles is the convenience of moving the goggles from a first position in front of the wearer's eyes when in use to another different position on the wearer when the goggles are not in use. For example, the goggles are moved to a second position in which the goggles are rested on the visor of the protective helmet. In this second position, the goggles can fall off of the visor. Some goggles may be provided without a strap and may be made of plastic. In this scenario, the goggles may break when they come in contact with the floor or other surface.

Other goggles may be provided with a strap for tethering the same to the individual. When such goggles are not in use, the wearer may lower the protective goggles into a third position in which the goggles hang around his(her) neck when the goggles are not in use. In this scenario, the goggles and strap may provide a potential choking hazard.

SUMMARY

The present disclosure relates to implementing systems and methods for coupling a clip to a wearable item. The methods comprise: receiving a latch structure of the clip in a channel of an accessory receiver provided with the wearable item; sliding side members of the latch structure against a surface of the channel; sliding a latch body of the latch structure against an edge of an opening for the channel (where the latch body being spaced apart from the common body portion of the latch structure which has a curved cross-sectional profile); bending the latch body by biasing the latch body towards the common body portion as the latch body slides against the edge; inserting the latch body and the side members through the channel until at least the free end of the latch body no longer resides in the channel, the latch body automatically unbending when the free end of the latch body no longer resides in the channel; and preventing at least the free end of the latch body from re-entering the channel such that the clip is coupled to the wearable item.

The free end of the latch body is horizontally offset from flanges of the side members when the latch body is in an un-bent state. The free end of the latch body is horizontally aligned with flanges of the side members when the latch body is in a bent state. The free end of the latch body and flanges of the side members slidingly engage the surface of the channel while the latch body and the side members travel through the channel. The biasing of the latch body is discontinued when the free end of the latch body no longer resides in the channel, after traveling through the channel. The free end of the latch body is prevented from re-entering the channel using an external surface of the accessory receiver surrounding the channel. The accessory receiver may be integrated with a brim of a helmet.

The present disclose also concerns a clip. The clip comprises: an elongate body portion having a curved cross-sectional profile; and a latch structure coupled to the elongate body portion at a first end. The latch structure comprises: at least one side member having a free end with a flange and being spaced apart from the elongate body portion; and a latch body residing adjacent to the at least one side member, being spaced apart from the elongate body portion, and having a free end that is vertically aligned with the flange. The at least one side member and the latch body are collectively sized and shaped to be received in a channel of an external receiver. The latch body is configured to be transitioned between an un-bent position and a bent position when biased in a direction towards the elongate body portion, and configured to automatically return to the unbent position when no longer being biased.

The free end of the latch body is horizontally offset from the flange of the at least one side member when the latch body is in an unbent position. The free end of the latch body is horizontally aligned with the flange of the at least one side member when the latch body is in a bent position. The free end of the latch body and the flange of the at least one side members are configured to be inserted through the channel of the external receiver. The external receiver is provided with a wearable item. The free end of the latch body is configured to engage the external receiver to facilitate attachment of the clip to the wearable item.

The present disclosure further concerns a system. The system comprises: a wearable item; an accessory receiver coupled to the wearable item and comprising a channel; and a clip. The clip comprises: an elongate body portion having a curved cross-sectional profile; and a latch structure coupled to the elongate body portion at a first end. The latch structure comprises: at least one side member having a free end with a flange and being spaced apart from the elongate body portion; and a latch body residing adjacent to the at least one side member, being spaced apart from the elongate body portion, and having a free end that is vertically aligned with the flange. The at least one side member and the latch body are collectively sized and shaped to be received in the channel of the accessory receiver. The latch body is configured to be transitioned between an un-bent position and a bent position when biased in a direction towards the elongate body portion by the accessory receiver, and configured to automatically return to the un-bent position when no longer being biased by the accessory receiver.

The free end of the latch body is horizontally offset from the flange of the at least one side member when the latch body is in the un-bent position. The free end of the latch body is horizontally aligned with the flange of the at least one side member when the latch body is in the bent position. The free end of the latch body and the flange of the at least one side member are configured to slidingly engage a surface of the channel while the latch body and the side members travel through the channel. The accessory receiver is configured to discontinue biasing the latch body when the free end of the latch body no longer resides in the channel after being inserted through the channel. An external surface of the accessory receiver that surrounds the channel is configured to prevent the free end of the latch body from re-entering the channel after the latch body has automatically returned to the unbent position. The wearable item may comprise a helmet. The accessory receiver may be integrated with a brim of the helmet.

BRIEF DESCRIPTION OF THE DRAWINGS

The present solution will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other. Generally, similar spatial references of different aspects or components indicate similar spatial orientation and/or positioning, i.e., that each "first end" is situated on or directed towards the same end of the device. Further, the use of various spatial terminology herein should not be interpreted to limit the various location techniques or orientations for identifying elements.

The present solution generally relates to a clip. The clip can be used in various applications, such wearable item applications. The wearable items can include, but are not limited to, safety helmets, waist belts, and armor. The present solution will be described herein in relation to safety helmet applications simply for ease of discussion.

Figure 1:
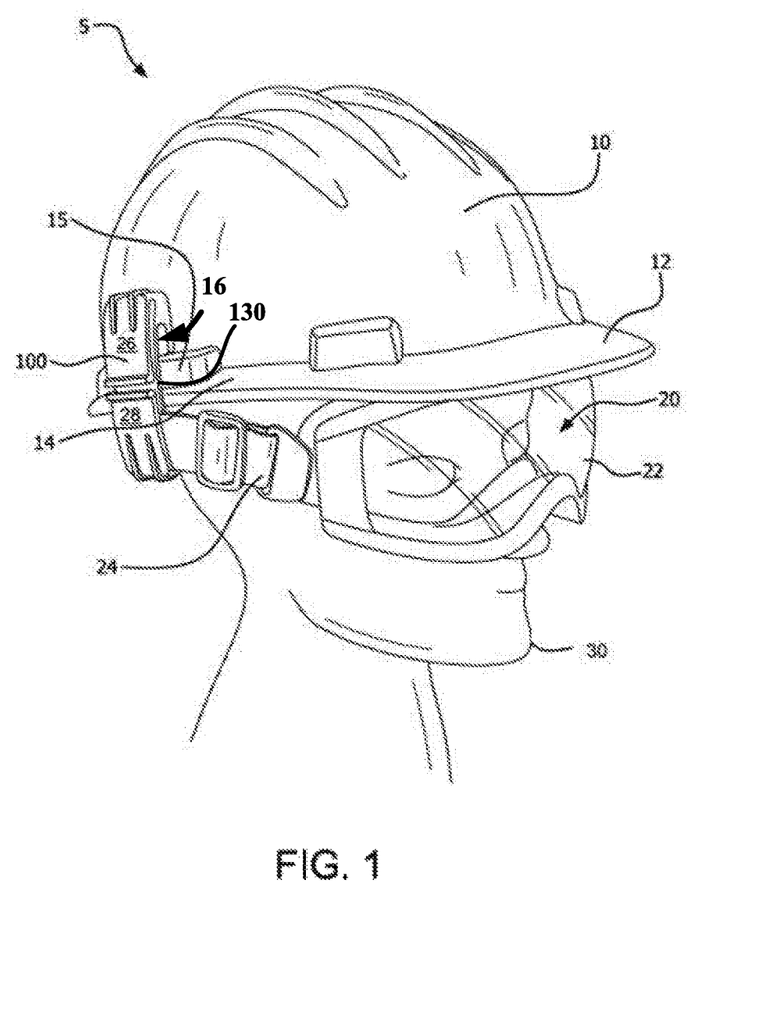
FIG. 1 provides an illustration of a system with clip(s) clipped to a goggle strap which is in a first position.
Figure 2:
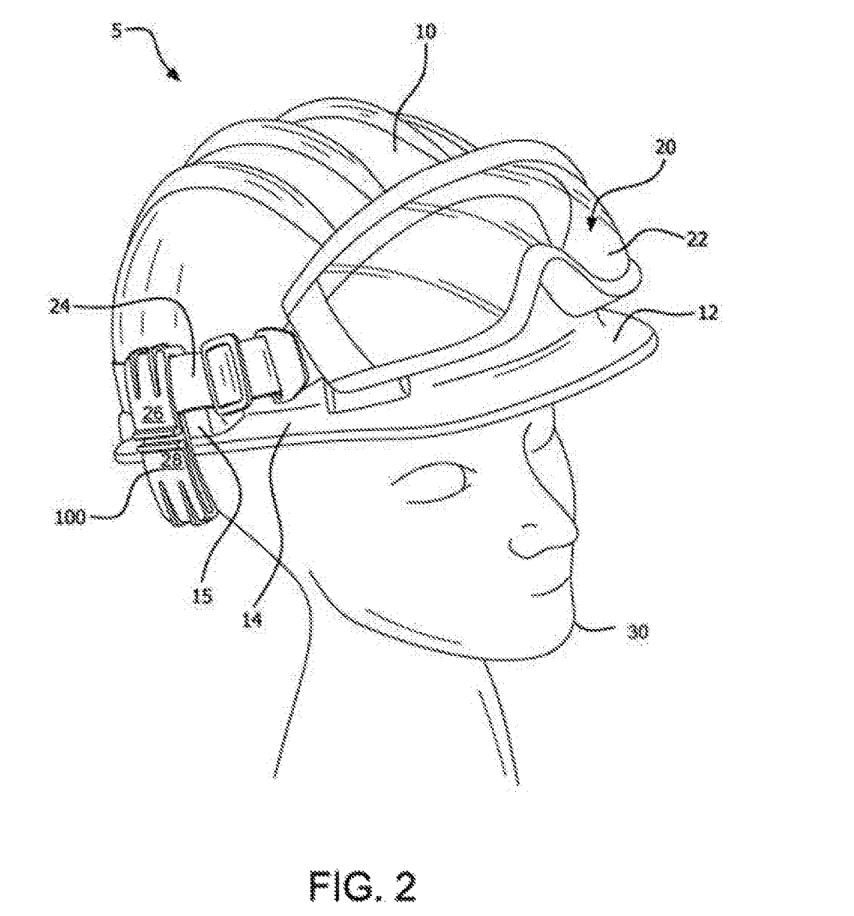
FIG. 2 provides an illustration of the system shown in FIG. 1 with the clip(s) clipped to the goggle strap which is in a second position.
Figure 3:
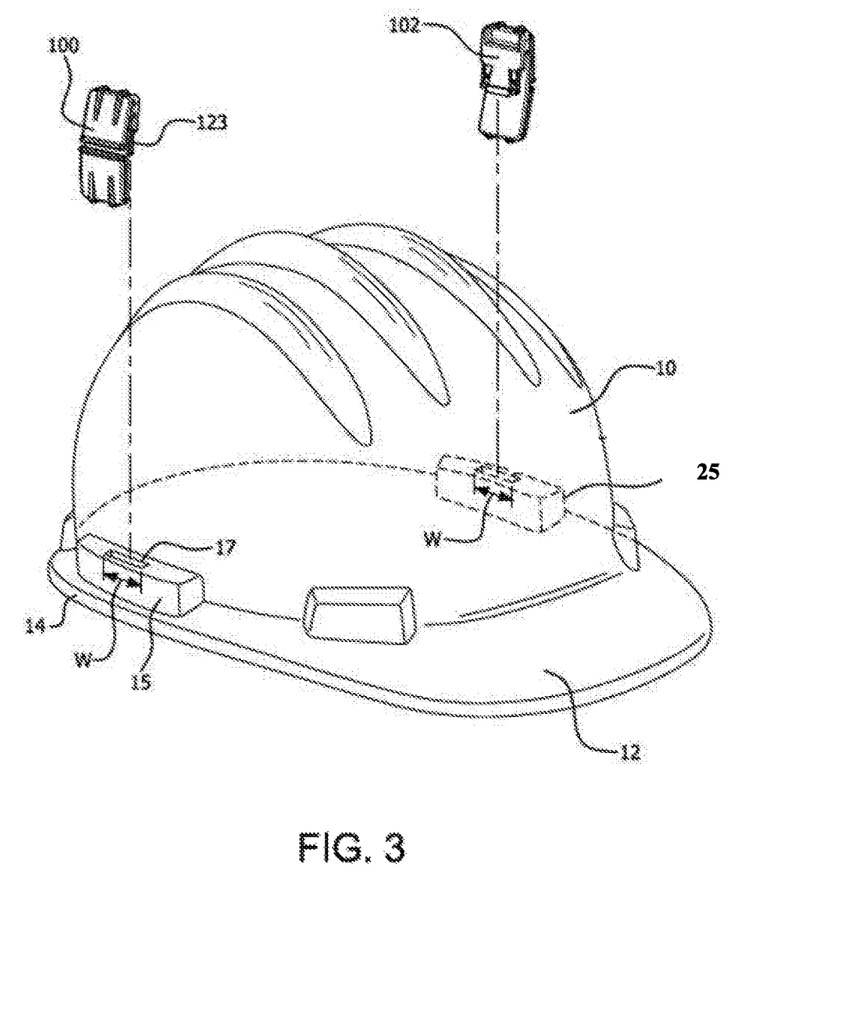
FIG. 3 provides an illustration showing the clip(s) decoupled from the safety helmet of FIG. 1.
Figure 4:
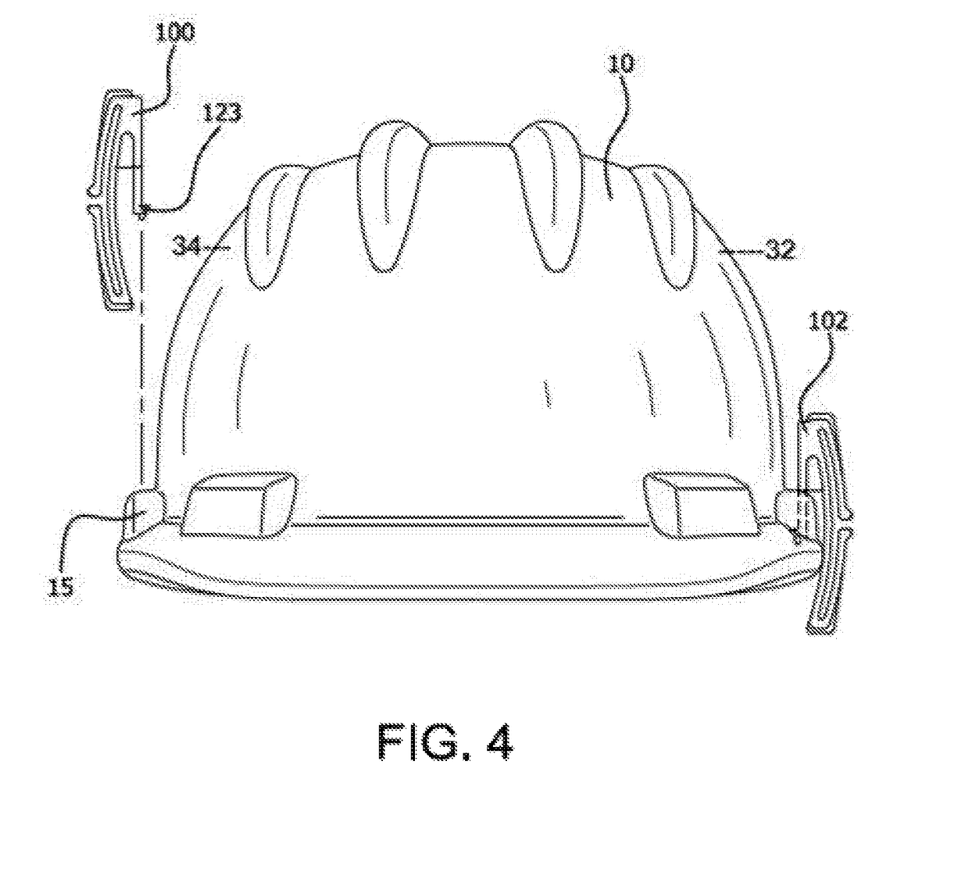
FIG. 4 provides a front view of a safety helmet with a clip installed in an accessory receiver thereof.

Referring now to FIGS. 1-4, there are provided illustrations of an illustrative system 5 comprising personal protective equipment. The personal protective equipment includes clips 100, 102, a wearable item 10, and a protective goggle apparatus 20. The wearable item 10 is shown as comprising a safety helmet. The present solution is not limited in this regard. The clip 102 is not visible in FIGS. 1-2, but is visible in FIGS. 3-4. The clips 100, 102 are shown in FIGS. 1-2 as being clipped to a strap 24. Each clip 100, 102 is designed so that the strap 24 can be transitioned by the individual 30 from a first position shown in FIG. 1 to a second position shown in FIG. 2. The first position is different than the second position. In the first position, the strap 24 resides in a lower clip portion 28 of each clip 100, 102. In the second position, the strap 24 resides in an upper clip portion 26 of each clip 100, 102. The clips 100, 102 can be made from any material selected for a given application. Such materials include, but are not limited to, metal and/or plastic. The upper and lower clip portions 26, 28 of each clip 100, 102 are coupled to each other. For example, the clip portions 26, 28 are coupled to each other via an adhesive and/or weld to a common body portion 130. In some scenarios, the upper and lower clip portions 26, 28 and/or common body portion 130 are formed as a single part (e.g., via an injection molding process and/or a metal heating/bending process).

Although two clips 100, 102 are shown in FIGS. 1-2, the present solution is not limited in this regard. System 5 may include any number of clips selected in accordance with a given application (e.g., one or more clips). For example, a single clip can be employed in some applications of the present solution.

Safety helmet 10 can include any known or to be known safety helmet. For example, the safety helmet 10 includes a hard-hat safety helmet as shown in FIGS. 1-4. The safety helmet 10 includes a brim 14 with a front helmet visor 12. The safety helmet 10 may include one or more accessory receivers 15 to facilitate an attachment of one or more accessories to the safety helmet. The accessories can include, but are not limited to, the clips 100, 102, lights and/or radios. In FIGS. 1-4, the safety helmet 10 includes a first accessory receiver 15 formed therein and a second accessory receiver 25 formed therein. The second accessory receiver 25 is located on a side 32 of the safety helmet that is opposed from the side 34 of the safety helmet on which the first accessory receiver 15 is formed. The first and second accessory receivers 15, 25 are vertically and horizontally aligned with each other. Each of the first and second accessory receivers 15, 25 comprises an insert space or channel 17 sized and shaped for receiving at least a portion of a clips 100, 102. The clips 100, 102 are removably attached to the safety helmet 10 when portions thereof are inserted into the insert spaces/channels 17 of the accessory receivers 15. Notably, the clips 100, 102 and accessory receivers 15 are configured so that the clips 100, 102 do not become detached from the safety helmet 10 while the protective goggle apparatus 20 is being worn by the individual 30 and/or the strap 24 moves between the upper and lower clip portions 26, 28.

The protective goggle apparatus 20 may include goggles 22 coupled to the strap 24. The strap 24 is configured to at least partially encircle the individual's head and/or at least partially encircle the safety helmet 10. The strap 24 may be at least partially formed of an elastic material such that it can be stretched around the individual's head and/or safety helmet 10. The strap 24 may alternatively be entirely formed of a non-elastic material with a length selected to allow the strap to be wrapped and/or tightened around the individual's head and/or safety helmet 10.

In FIG. 1, the goggles 22 are being worn by the individual 30 to protect his(her) eyes from injury. The strap 24 is positioned in a channel 16 of each clip 100, 102 such that it resides below the visor 12 and brim 14 of the safety helmet 10 when the goggles 22 are being worn by the individual 30. In this regard, it should be understood that the strap 24 is able to automatically slide and/or be manually slid in two opposing directions within the channel 16 of each clip 100, 102. The channel 16 extends from the upper clip portion 26 of the clip 100, 102 to the lower clip portion 28 of the clip 100, 102. The strap 24 slides into the lower clip portion 28 when the goggles 22 are being moved into position on the individual's face for protecting his(her) eyes. The strap 24 may automatically change its position within channel 16 as the individual adjusts positioning of the googles 22 on his(her) face during use of the googles. The strap 24 automatically slides out of the lower clip portion 28 and into the upper clip portion 26 when the goggles 22 are being removed from the individual's face and, for example, into a position on the safety helmet 10 as shown in FIG. 2. When in the upper clip portion 26, the strap 24 resides above the visor 12 and/or brim 14 of the helmet 10

Figure 5:
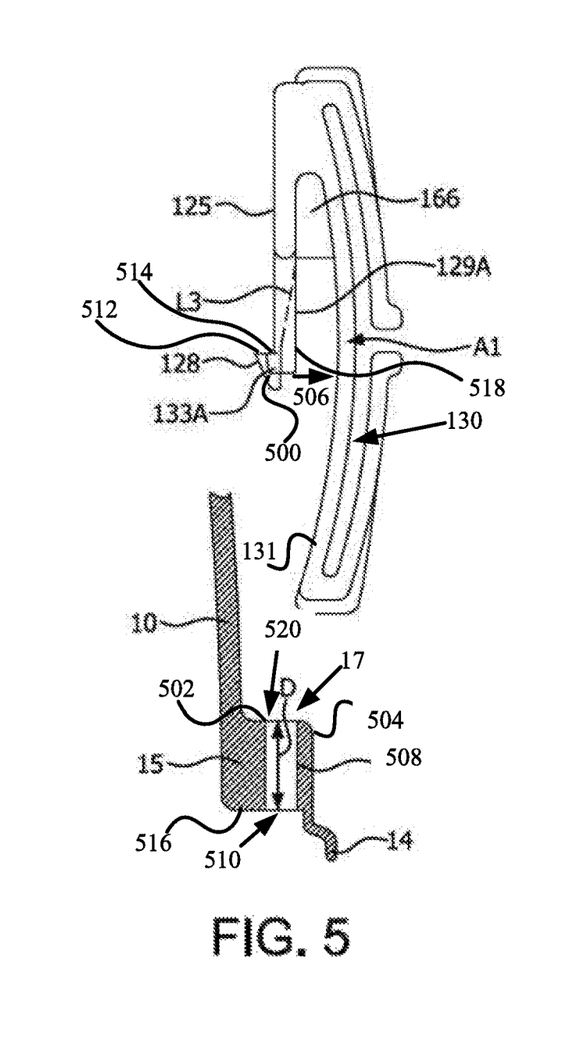
FIG. 5 provides an illustration showing an accessory receiver of a safety helmet and a clip that has been separated from the hard-hat safety helmet.

The attaching and/or detaching of the clips 100, 102 to/from the safety helmet 10 will be described below in detail in relation to FIGS. 5-7. The manner in which the clip 102 is attached and/or detached to/from the safety helmet 10 is the same as or substantially different than that of clips 100. As such, the discussion provided below in relation to clip 100 is sufficient for understanding how the clip 102 is attached to and/or detached from the safety helmet 10.

In order to understand the attaching/detaching process, certain features of the clip 100 will first be described in relation to FIGS. 8-16. Notably, the clip 102 is the same as or substantially similar to clips 100. As such, the following discussion of clips 100 is sufficient for understanding clip 102.

As shown in FIGS. 8-16, the clip 100 comprises a clip body 120 including the common body portion 130. The common body portion 130 has a first side 138 and a second opposing side 139. A first clip element 122 is integrated with the first side 138 of the common body portion 130. A second clip element 150 and a third clip element 155 are integrated with the second side 139 of the common body portion 130. The third clip element 155 diametrically opposes the second clip element 150. The second clip element 150 and second side 139 defines the upper clip portion 26 of the clip 100. The third clip element 155 and the second side 139 defines the lower clip portion 28 of the clip 100.

The first clip element 122 is coupled to and/or integrated with the common body portion 130 to form a J-channel clip 124. The common body portion 130 is curved in a direction of the J-channel clip 124. The first clip element 122 comprises an elongate member 125 having a top portion 126 coupled to the first end 134 of the common body portion 130. The top portion 126 of the first clip element 122 extends substantially the width of the common body portion 130, as shown in at least FIGS. 8, 9 and 11. A body portion 135 of elongate member 125 extends adjacent to and is spaced apart from a surface 131 of the common body portion 130. The body portion 135 of the elongate member 125 is sized and shaped to fit within the insert space/channel 17 of the accessory receiver 15 provided with a safety helmet 10. In this regard, the body portion 135 may have a generally linear or straight shape.

A latch structure 123 is coupled to and extends from the elongated member 125 of the first clip element 122. The latch structure 123 comprises a latch body 127 having a free end 128 that is generally hook-shaped. The free end 128 is configured to latchingly engage the accessory receiver 15 so as to facilitate an attachment of the clip 100 to the safety helmet 10.

A rib member 166 is coupled to and extends between an interior surface 121 of the elongate member 125 and the surface 131 of the common body portion 130. Rib member 166 structurally supports the elongate member 125 so that the elongate member 125 maintains a given distance from the common body portion 130. The rib member 166 also provides a stop to limit a depth at which the latch body 127 may extend through, out of and/or below the channel 17 formed in the accessory receiver 15 of the safety helmet 10, when the elongate member 125 is fully inserted therein.

The latch body 127 is flanked by side members 129A and 129B. Each side member 129A, 129B comprises free end having a flange 133A, 133B. The purpose of the flanges 133A and 133B is to facilitate the attachment or latching of the google clip 100 to the accessory receiver 15. The Returning now to FIGS. 5-7, illustrations are provided showing an illustrative process for attaching/detaching the clips 100 to/from the safety helmet 10. As noted above, the accessory receiver 15 of the safety helmet 10 has an insert space/channel 17 formed therein. Channel 17 has a depth D (shown in FIG. 5) and a width W (shown in FIG. 3) dimensioned to receive at least a portion of the latch structure 123 (more particularly, the latch body 127 and side members 129A, 129B). In this regard, it should be understood that the combined width W' of the latch body 127 and side members 129A, 129B is less than the width W of channel 17. Since the top portion 126 of the elongate member 125 has a width W" greater than the width W of the channel 17, it provides a stop mechanism to limit a distance that the latch structure 123 can extend through the accessory receiver 15 of the safety helmet 10.

The clip 100 is attached to the safety helmet 10 via an insertion of the latch structure 123 into the channel 17 of the accessory receiver 15. During insertion of the latch structure 123 into channel 17, an engagement surface 518 of each side members 129A, 129B slide against an internal surface 508 of the channel 17. An angled engagement surface 500 of the latch body 127 initially slides against an edge 502 of channel's opening 520. Surface 131 of the common body portion 130 may slide against an exterior surface 504 of the accessory receiver 15. This sliding engagement(s) cause(s) the latch body 127 to be pushed or biased in a direction 506 towards the common body portion 130 (as denoted by the dashed line L3 shown in FIG. 5 and FIG. 7). This pushing/biasing causes the latch body 127 to bend or flex in direction 506, and the latch body's fee end 128 to become horizontally aligned with flanges 133A, 133B of side members 129A, 129B. At this time, the latch body 127 is in a biased position. Notably, the latch body's fee end 128 is vertically aligned with flanges 133A, 133B of side members 129A, 129B when in an non-biased position, but is not horizontally aligned with the same. The latch body's fee end 128 is vertically and horizontally aligned with flanges 133A, 133B of side members 129A, 129B when in the biased position.

Figure 6:
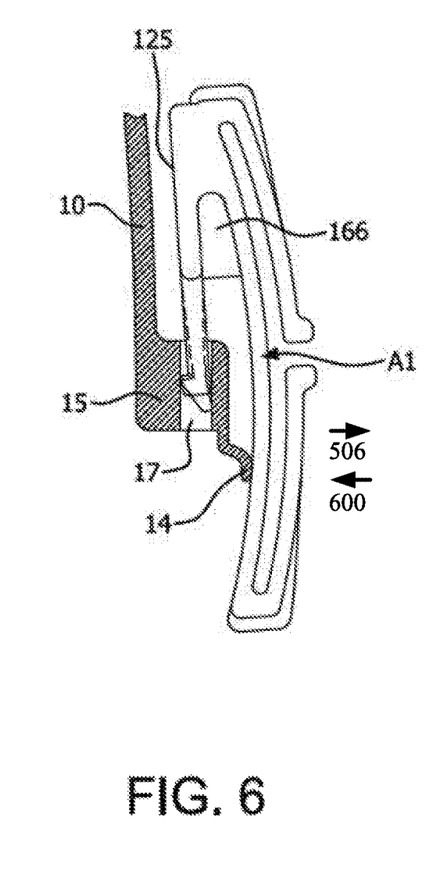
FIG. 6 provides an illustration showing an accessory receiver of a safety helmet and a clip detached or unlatched from the hard-hat safety helmet.
Figure 7:
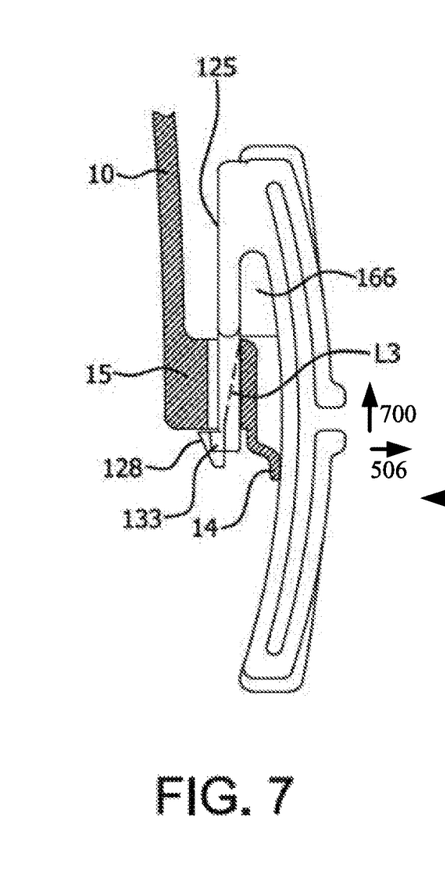
FIG. 7 provides an illustration showing an accessory receiver of a safety helmet and a clip attached or latched to the safety helmet.
Figure 8:
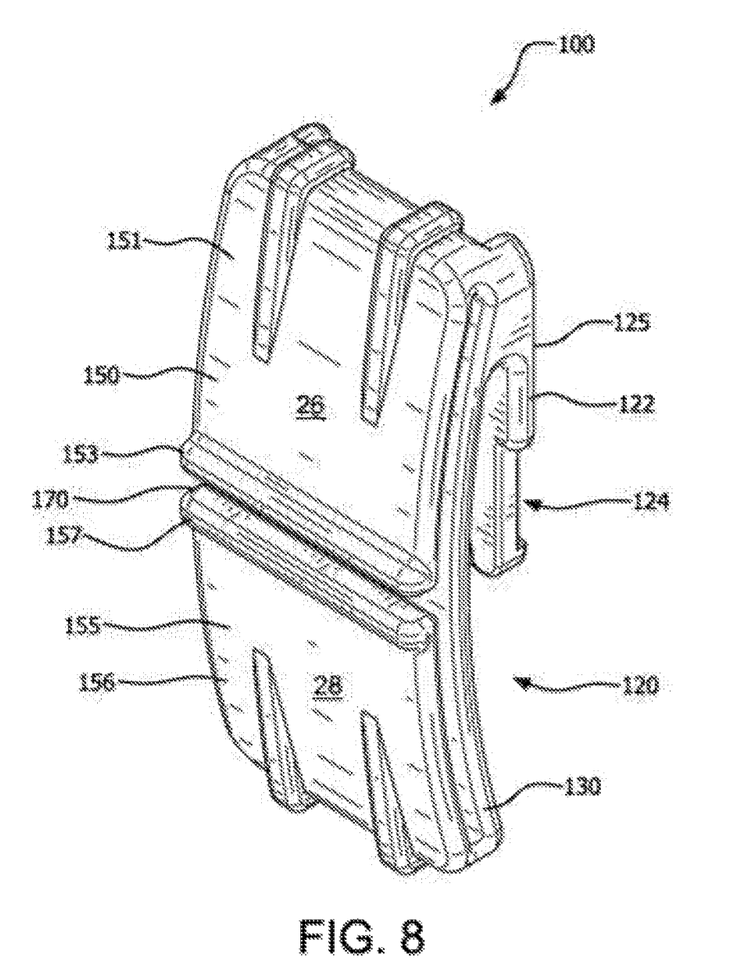
FIG. 8 provides a front perspective view of the clip shown in FIG. 1.
Figure 9:
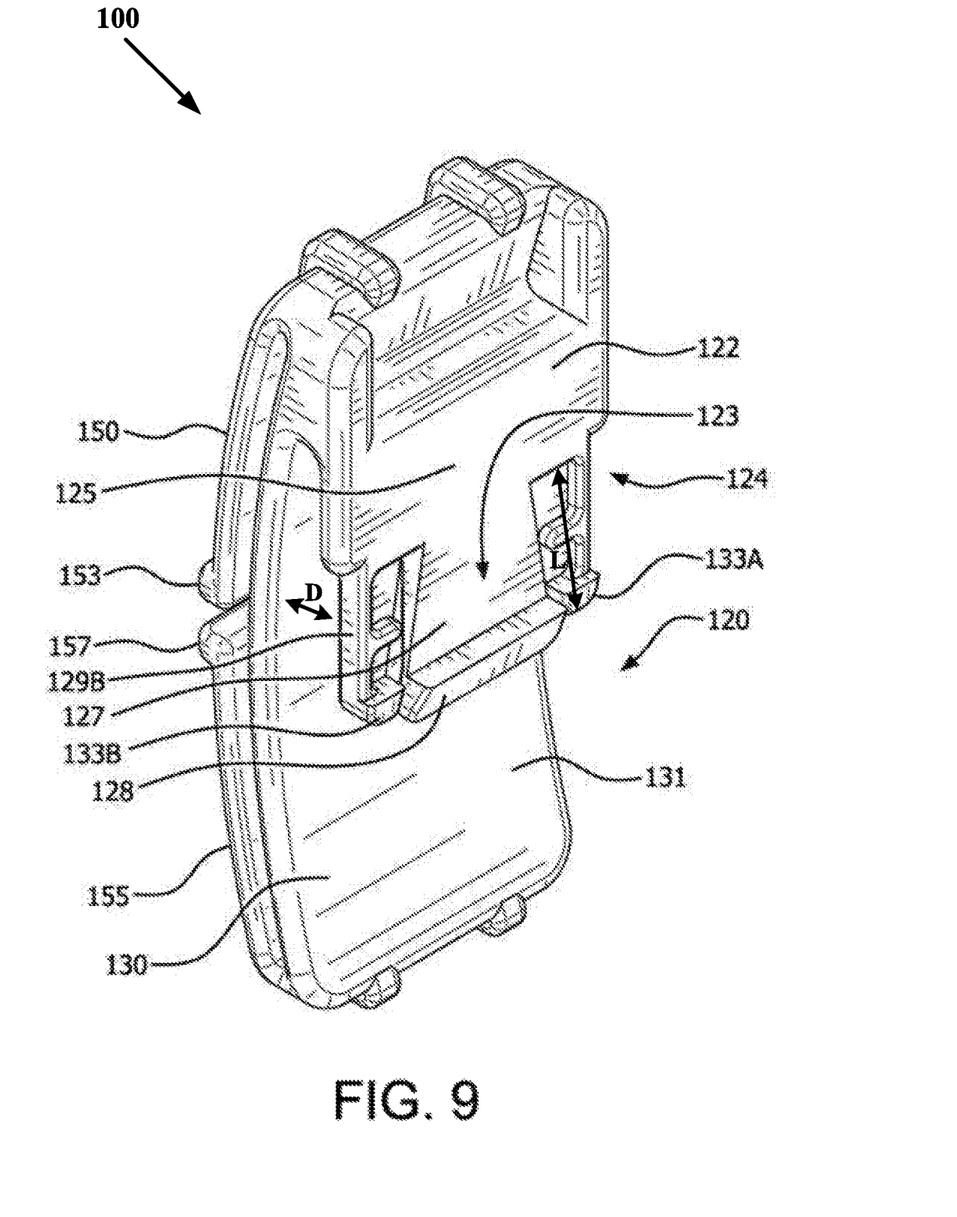
FIG. 9 provides a back perspective view of the clip shown in FIGS. 1 and 8.

Components 128, 133A, 133B slidingly and/or frictionally engage a surface 508 of the channel 17 while the latch structure 123 is being further inserted into the accessory receiver 15 of the safety helmet 10 (as shown in FIG. 6). In some scenarios, a frictional engagement is not desirable. Accordingly, surface 504 and/or 508 may be coated with a material to minimize or eliminate any frictional engagement with components 128, 130, 133A, 133B. The present solution is not limited in this regard.

When the latch structure 123 is inserted further into the channel 17, the latch body's fee end 128 and the flanges 133A, 133B will begin to extend out of a bottom end 510 of the channel 17. The surface 131 of the common body portion 130 may also begin to slide against an exterior surface of the brim 14. Once the free end 128 and the flanges 133A, 133B no longer resides in the channel 17, the latch body 127 will automatically return to its non-biased position as shown in FIG. 7. In this non-biased position, a surface 512 of the latch body 127 and/or surfaces 514 of flanges 133A, 133B engage and are in contact with a bottom surface 516 of the accessory receiver 10. Consequently, the latch structure 123 is attached or latched to the brim 14 or other structural element of the safety helmet 10.

The clip 100 may be detached or unlatched from the safety helmet 10 at select times by the individual 30. The detaching or unlatching is achieved by manually applying a pushing force in direction 506 to the latch body's free end 128 and/or flanges 133A, 133B until the same no longer engage the bottom surface 516 of the accessory receiver 10. Thereafter, a pulling force is applied to the clip 100 in a direction 700. The pulling force causes the clip 100 to move in direction 700 until the latch body 127 no longer resides in channel 17 of the accessory slot 15.

Figure 12:
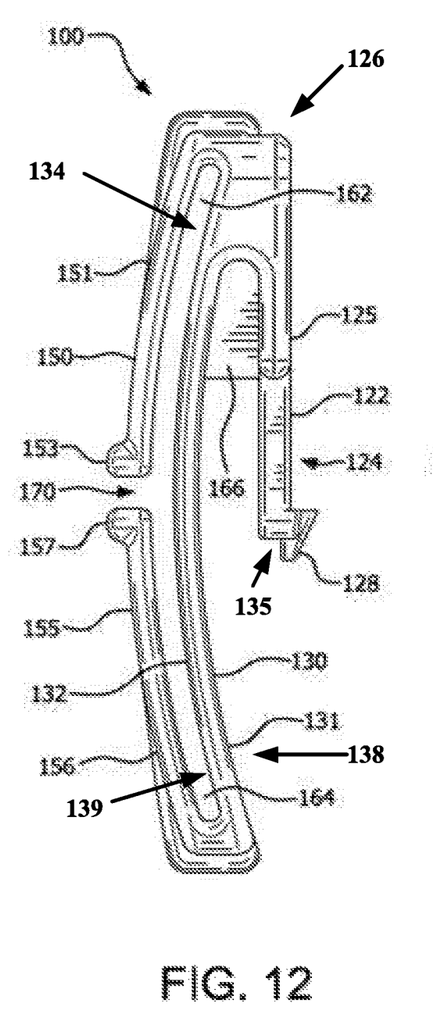
FIGS. 12 and 13 each provide a side view of the clip shown in FIGS. 1 and 8-11.
Figure 13:
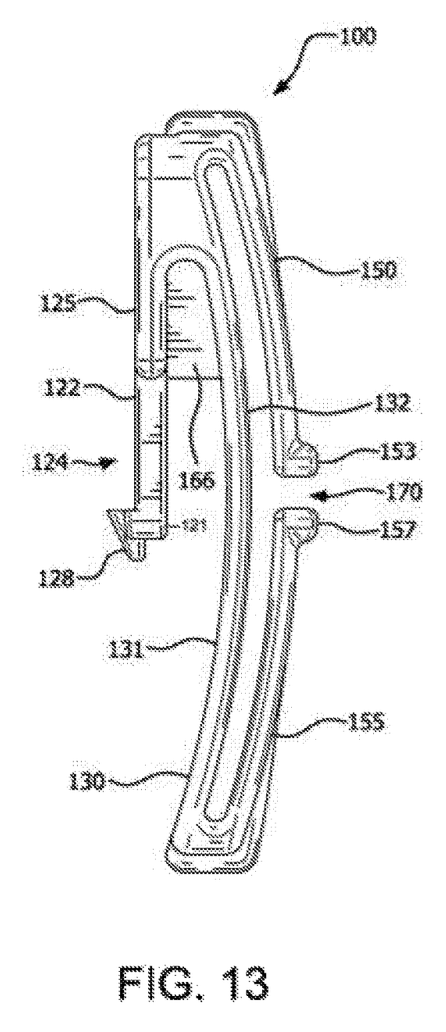
Figure 14:
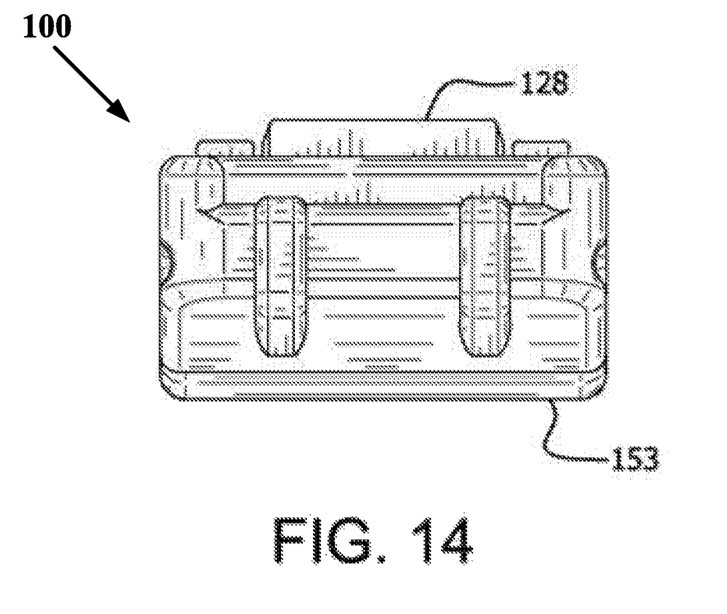
FIG. 14 provides a top view of the clip shown in FIGS. 1 and 8-13.
Figure 15:
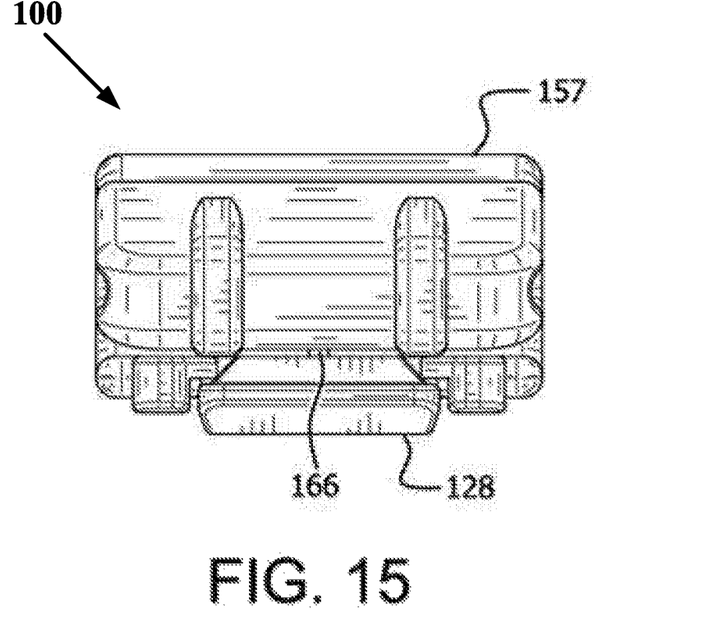
FIG. 15 provides a bottom view of the clip shown in FIGS. 1 and 8-14.
Figure 16:
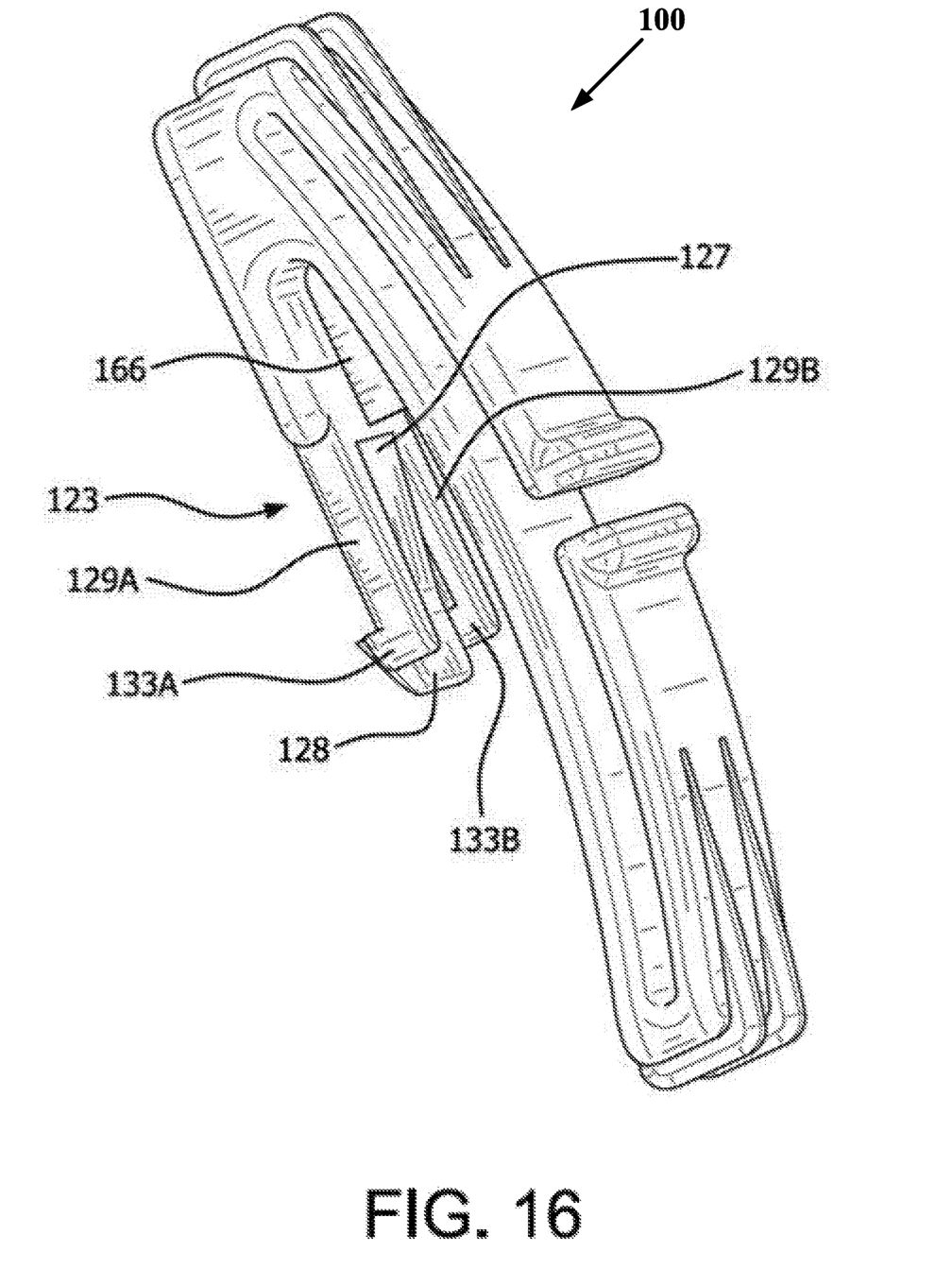
FIG. 16 provides a perspective view of the clip shown in FIGS. 1 and 8-15.

Other features of the clip 100 will now be described. As shown in FIGS. 12-13, the common body portion 130 has a curved cross-sectional profile. As such, a distance D between the side members 129A, 129B and surface 131 of the common body portion 130 is variable along the length L of the side members 129A, 129B. Also, a first side 138 of the common body portion 130 includes a concave surface 131, and the second side 139 of the common body portion 130 includes a convex surface 132. Notably, the common body portion 130 curves in a direction towards the individual's head when the clip 100 is secured in the accessory receiver 15. The second clip element 150 of the clip 100 includes a concave member 151. The third clip element 155 of the clip 100 also includes a concave member 156. A free end 153 of concave member 151 is located adjacent to and spaced apart from a free end 157 of concave member 156. Accordingly, an opening 170 is provided between free ends 153, 157. The opening 170 allows the strap 24 to be inserted into channel 16 of the clip 100. The opening 170 is sized and shaped to receive the strap 24. As the strap 24 is being inserted into the opening 170, the strap may be twisted, bent or curved to facilitate slipping of the strap into the channel 16. Once positioned in the channel 16, the strap 24 is maintained therein by the clip elements 150, 155. Each of the free ends 153, 157 of concave members 151, 156 may comprise a lip.

The concave member 151 of the second clip element 150 extends adjacent to an upper portion of surface 132 of the common body portion 130. The concave member 156 of the third clip element 155 extends adjacent to a lower portion of surface 132 of the common body portion 130. A first portion 162 of channel 16 is provided between concave member 151 of the second clip element 150 and surface 132 of the common body portion 130. A second portion 164 of channel 16 is provided between concave member 156 of the third clip element 155 and surface 132 of the common body portion 130. The first and second channel portions 162, 164 have generally U-shapes and share concave surface 131 of the common body portion 130.

Figure 10:
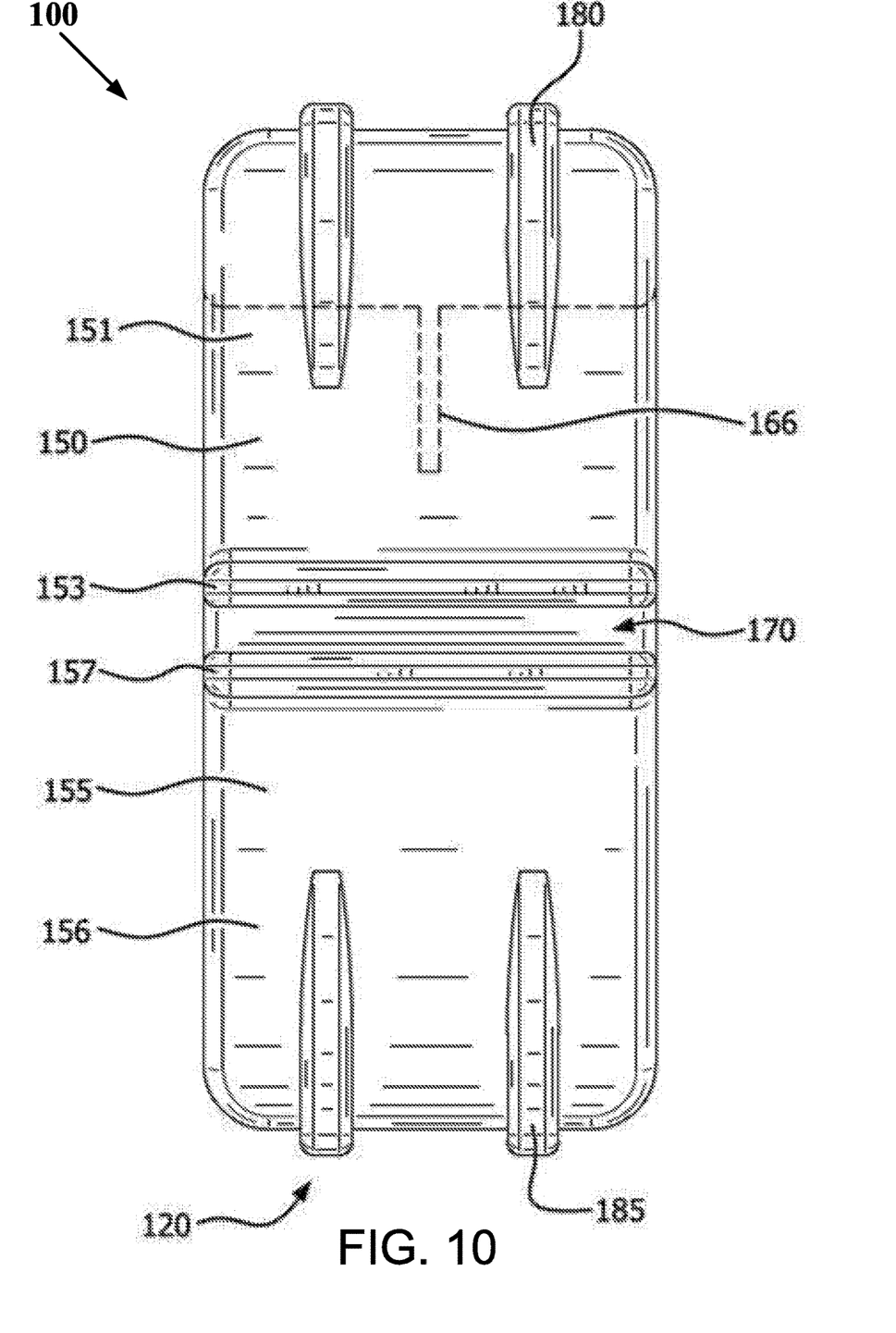
FIG. 10 provides a front view of the clip shown in FIGS. 1, 8 and 9.
Figure 11:
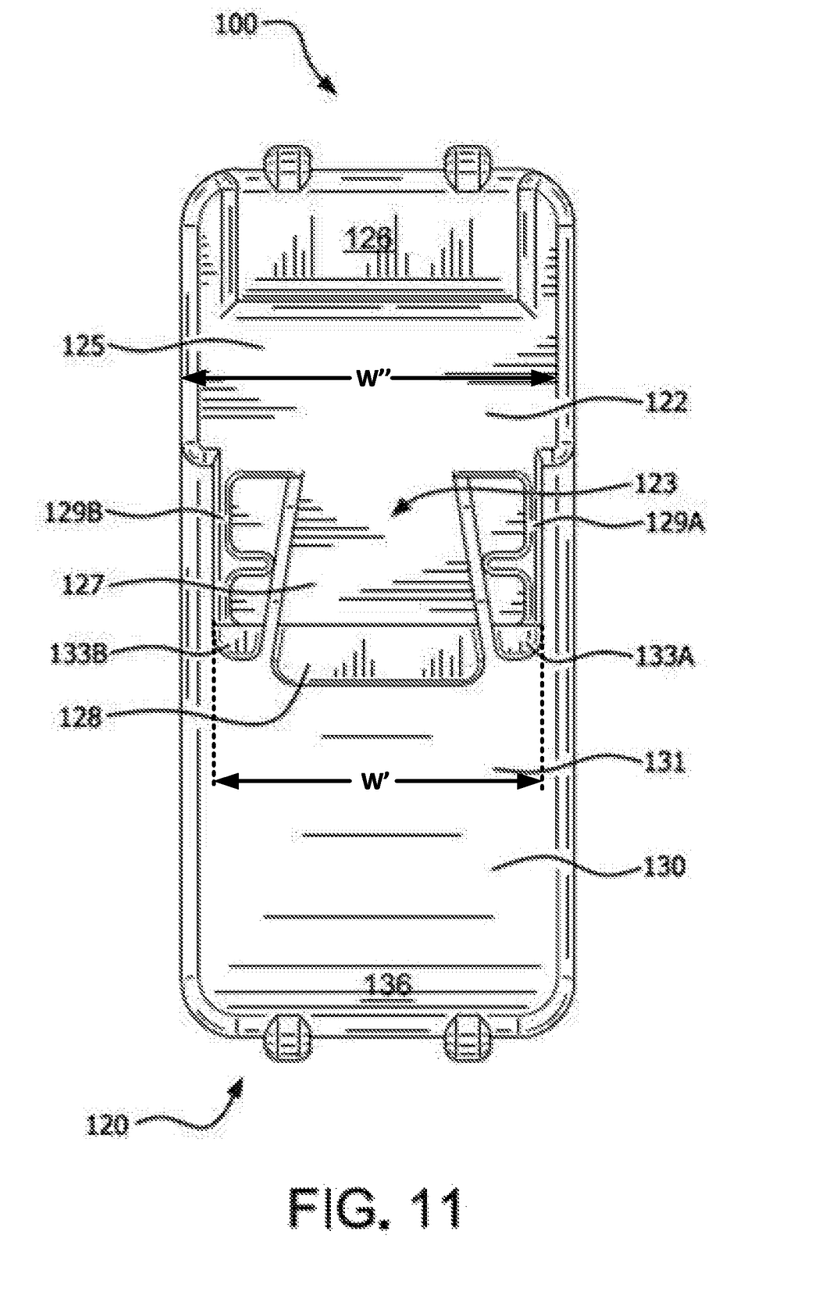
FIG. 11 provides a back view of the clip shown in FIGS. 1 and 8-10.

The clip body 120 may include reinforcement structure(s) 180 and 185, as shown in at least FIG. 10. The reinforcement structures 180 may be coupled to and/or integrated with the top portion 126 of the second clip element 150. The reinforcement structure(s) 185 may be coupled to and/or integrated with a lower portion 136 of the third clip element 155.

Once the latch structure 123 is coupled to the safety helmet 10, the brim 14 may emulate a stop mechanism by applying a force on the common body portion 130 to limit movement of the clip 100 medially toward the individual's head. In other words, the brim 14 may serve as a standoff surface to maintain a given distance between the clip 100 and the individual's head. Even if a force is imparted to the goggle apparatus 20 or strap 24 which would cause an application of force on the clip 100 toward the individual, the brim 14 applies a force in a direction away from the individual on the common body portion 130. An apex A1 of the concave curvature of the common body portion 130 is configured to be most distant from the accessory receiver 15. In some scenarios, when the latch structure 123 is coupled to the safety helmet 10, the brim 14 is in close proximity to the apex A1 of the concave curvature. Apex A1 may be located to coincide with a location of the shared opening 170. The location of the apex A1 may be approximately a mid-point of the common body portion 130.

In some scenarios, the clip 100 has a length of approximately 3 inches, and a width of 1⅜ inches. The shared opening 170 has a width of approximately ⅛ inches. The strap 24 has a width less than half the length of the clip 100 (e.g., 1-3 inches), and a thickness less than ⅛ inches. The present solution is not limited in this regard.

Figure 17:
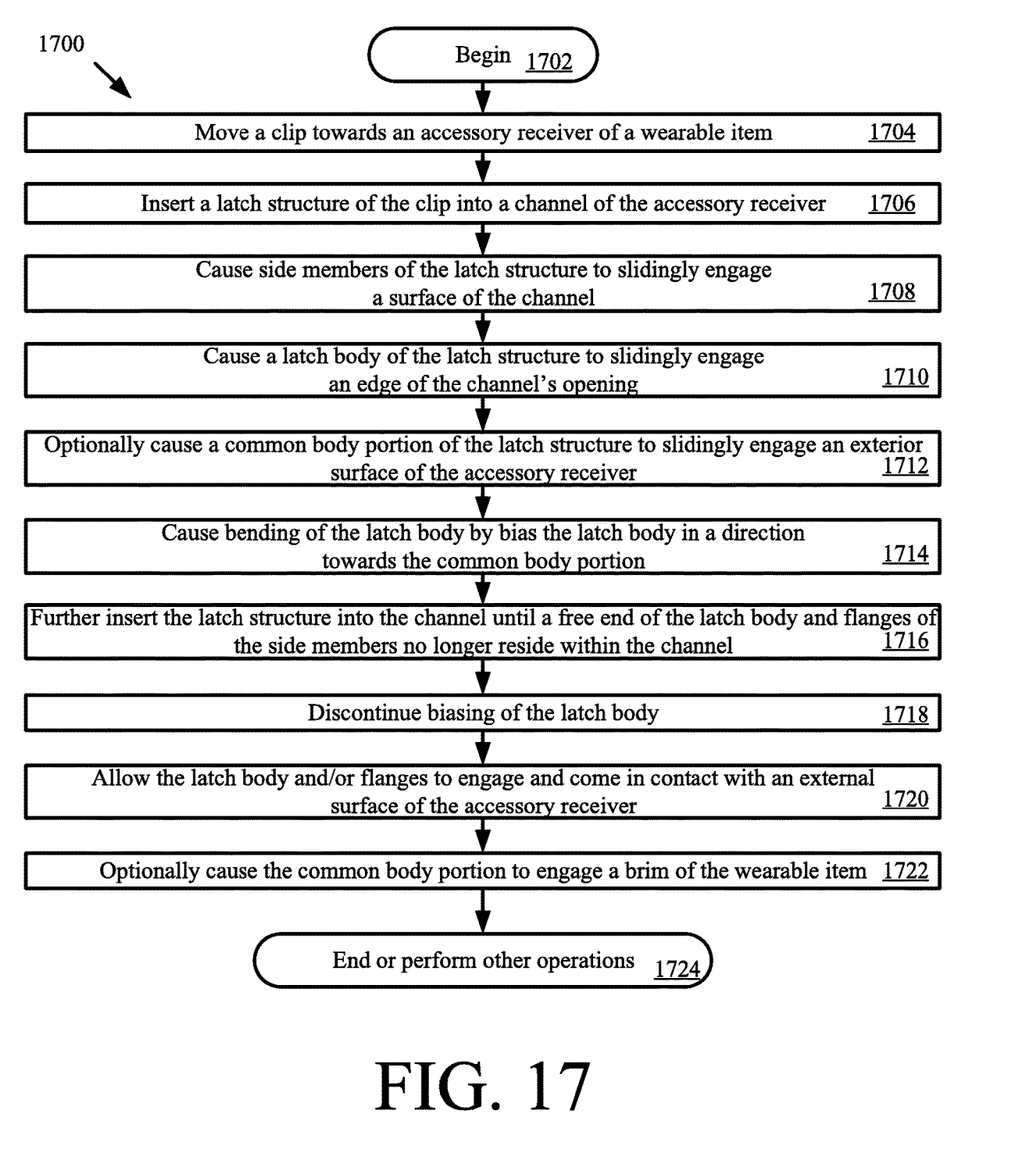
FIG. 17 provides a flow diagram of an illustrative method for using a clip.

Referring now to FIG. 17, there is provided a flow diagram of an illustrative method 1700 for using a clip (e.g., clip 100, 102 of FIGS. 1-16) with a wearable item (e.g., safety helmet 10 of FIGS. 1-4). Method 1700 begins with 1702 and continues with 1704 where the clip is moved towards an accessory receiver (e.g., accessory receiver 15 of FIGS. 1-4) of the wearable item. The accessory receiver comprises a channel (e.g., channel 17 of FIG. 3) that is sized and shaped for receiving a latch structure (e.g., latch structure 123 of FIG. 4) of the clip. Next in 1706, the latch structure is inserted into the channel. Side members (e.g., side members 129A, 129B of FIG. 11) of the latch structure are caused to slidingly engage a surface (e.g., surface 508 of FIG. 5) of the channel, as shown by 1708. A latch body of the latch structure is caused to slidingly engage an edge (e.g., edge 502 of FIG. 5) of the channel's opening (e.g., opening 520 of FIG. 5), as shown by 1710. A common body portion (e.g., common body portion 130 of FIG. 5) is optionally caused to slidingly engage an exterior surface (e.g., surface 504 of FIG. 5) of the accessory receiver, as shown by 1712.

In 1714, the latch body is bent. This bending is achieved by biasing the latch body in a direction (e.g., direction 506 of FIG. 5) towards the common body portion. The latch structure is further inserted into the channel until a free end (e.g., free end 128 of FIG. 5) of the latch body and flanges (e.g., flanges 133A, 133B of FIG. 9) of the side members no longer reside within the channel, as shown by 1716. In 1718, biasing of the latch body is discontinued. The latch body and/or flanges are allowed to engage and come in contact with an external surface (e.g., surface 516 of FIG. 5) of the accessory receiver, as shown by 1720. In some scenarios, the accessory receiver is at least partially integrated with a brim of a helmet. As such the external surface of the accessory receiver may also be a surface of the brim. In 1722, the common body portion is optionally caused to engage a brim of the wearable item. Subsequently, 1724 is performed where method 1700 ends or other operations are performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for coupling a clip to a wearable item, comprising:
   receiving a latch structure of the clip in a channel of an accessory receiver provided with the wearable item;
   sliding side members of the latch structure against a surface of the channel;
   sliding a latch body of the latch structure against an edge of an opening for the channel, the latch body being spaced apart from a common body portion of the latch structure which has a curved cross-sectional profile;
   bending the latch body by biasing the latch body towards the common body portion as the latch body slides against the edge;
   inserting the latch body and the side members through the channel until at least a free end of the latch body no longer resides in the channel, the latch body automatically unbending when the free end of the latch body no longer resides in the channel; and
   preventing at least the free end of the latch body from re-entering the channel such that the clip is coupled to the wearable item;
   wherein the free end of the latch body is horizontally aligned with flanges of the side members when the latch body is in a bent state.

2. The method according to claim 1, wherein the free end of the latch body is horizontally offset from the flanges of the side members when the latch body is in an un-bent state.

3. The method according to claim 1, wherein the free end of the latch body and the flanges of the side members slidingly engage the surface of the channel while the latch body and the side members travel through the channel.

4. The method according to claim 1, further comprising discontinuing biasing the latch body when the free end of the latch body no longer resides in the channel.

5. The method according to claim 1, wherein the free end of the latch body is prevented from re-entering the channel using an external surface of the accessory receiver surrounding the channel.

6. The method according to claim 1, wherein the accessory receiver is integrated with a brim of a helmet.

7. The method according to claim 1, wherein the wearable item comprises a helmet and the accessory receiver is integrated with a brim of the helmet.

8. A clip, comprising:
   an elongate body portion having a curved cross-sectional profile; and
   a latch structure coupled to the elongate body portion at a first end, and comprising:
   at least one side member having a free end with a flange and being spaced apart from the elongate body portion; and a latch body residing adjacent to the at least one side member, being spaced apart from the elongate body portion, and having a free end that is vertically aligned with the flange;

wherein the at least one side member and the latch body are collectively sized and shaped to be received in a channel of an external receiver;

wherein the latch body is configured to be transitioned between an un-bent position and a bent position when biased in a direction towards the elongate body portion, and configured to automatically return to the un-bent position when no longer being biased; and wherein the free end of the latch body is horizontally aligned with the flange of the at least one side member when the latch body is in the bent position.

9. The clip according to claim 8, wherein the free end of the latch body is horizontally offset from the flange of the at least one side member when the latch body is in the un-bent position.

10. The clip according to claim 8, wherein the free end of the latch body and the flange of the at least one side member are configured to be inserted through the channel of the external receiver.

11. The clip according to claim 8, wherein the external receiver is provided with a wearable item.

12. The clip according to claim 11, wherein the free end of the latch body is configured to engage the external receiver to facilitate attachment of the clip to the wearable item.

13. A system, comprising:
a wearable item;
an accessory receiver coupled to the wearable item and comprising a channel; and
a clip comprising:
an elongate body portion having a curved cross-sectional profile; and
a latch structure coupled to the elongate body portion at a first end, and comprising:
at least one side member having a free end with a flange and being spaced apart from the elongate body portion; and
a latch body residing adjacent to the at least one side member, being spaced apart from the elongate body portion, and having a free end that is vertically aligned with the flange;

wherein the at least one side member and the latch body are collectively sized and shaped to be received in the channel of the accessory receiver;

wherein the latch body is configured to be transitioned between an un-bent position and a bent position when biased in a direction towards the elongate body portion by the accessory receiver, and configured to automatically return to the un-bent position when no longer being biased by the accessory receiver; and wherein the free end of the latch body is horizontally aligned with the flange of the at least one side member when the latch body is in the bent position.

14. The system according to claim 13, wherein the free end of the latch body is horizontally offset from the flange of the at least one side member when the latch body is in the un-bent position.

15. The system according to claim 13, wherein the free end of the latch body and the flange of the at least one side member are configured to slidingly engage a surface of the channel while the latch body and the side member travel through the channel.

16. The system according to claim 13, wherein the accessory receiver is configured to discontinue biasing the latch body when the free end of the latch body no longer resides in the channel after being inserted through the channel.

17. The system according to claim 13, wherein an external surface of the accessory receiver that surrounds the channel is configured to prevent the free end of the latch body from re-entering the channel after the latch body has automatically returned to the un-bent position.

\* \* \* \* \*